Patented Jan. 9, 1940

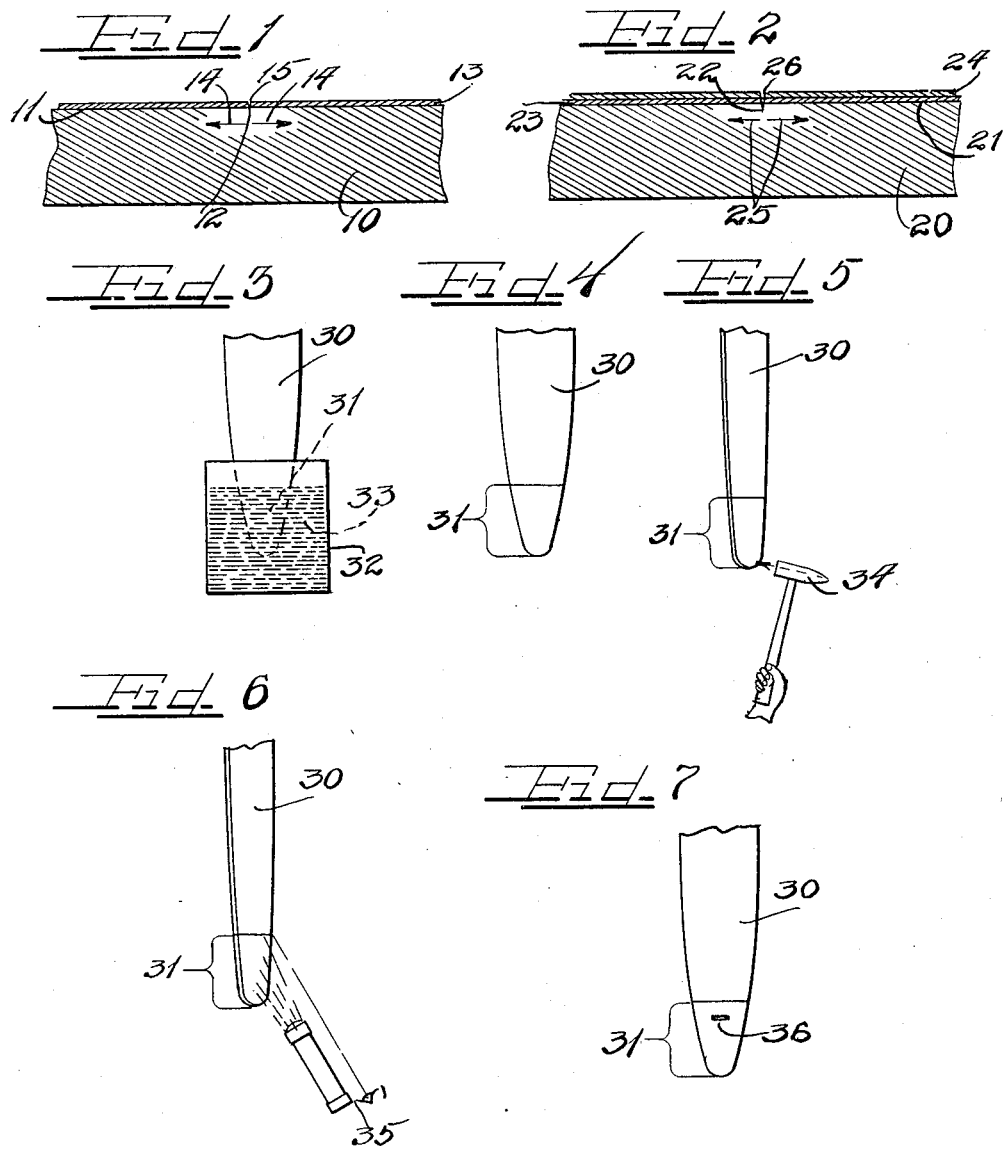

2,186,014

UNITED STATES PATENT OFFICE 2,186,014

METHOD OF DETECTING FLAWS IN RIGID MATERIAL

Greer Ellis, Cambridge, Mass., assignor to Magnaflux Corporation, Chicago, Ill., a corporation of Pennsylvania Application November 7, 1938, Serial No. 239,337

16 Claims. (Cl. 73—51)

This invention relates to a method of treating rigid materials of relatively high elastic limit to make flaws and cracks therein, not apparent to the naked eye, capable of easy detection. More particularly, it relates to a method of making flaws and cracks therein capable of easy visual detection, by coating such articles with a continuous adherent brittle film and applying appropriate loads thereto.

It has heretofore been proposed to include in a process for measuring strains in metallic articles a preliminary step comprising the coating of such articles with a brittle film of varnish or resinous compositions, to make the direction of elastic strains in such articles capable of visual detection. Obviously, sufficient elongation of an article so coated causes the film to crack perpendicularly to the strain. A following step in the process comprises repeating the stressing of the article and measuring the elongation produced whose direction has previously been determined, by means of suitable measuring instruments.

I have made the surprising discovery that the application of an adherent continuous brittle film on a material of relatively high elastic limit makes otherwise not apparent flaws or cracks in such material capable of easy detection. I have particularly found that the application of a suitable load to an article thus coated causes the brittle film to crack preferentially above such flaws or cracks. Since cracks in the continuous brittle film are easily detectable, such cracks serve to indicate the presence, size and direction of defects in the rigid material.

It is, therefore, an important object of this invention to provide a method of treating rigid materials of relatively high elastic limit to make cracks or flaws therein capable of easy detection.

Another important object of this invention is to provide a method of making flaws and cracks in metallic articles capable of easy visual detection by coating such articles with continuous brittle films and applying suitable loads thereto.

Other and further important objects of this invention will become apparent from the appended description and claims.

The present invention is based on the discovery that superficial defects in rigid materials of relatively high elastic limit effect a concentration above or around themselves of strains not parallel to the direction of such defects. The latter may actually penetrate the surface of the rigid material or they may exist adjacent to the surface. These defects may be rendered capable of easy detection by the following method. An article to be tested for possible flaws is coated with a continuous adherent film which is brittle enough to crack at a strain produced by a stress below the elastic limit of the material composing the article being tested. A load capable of setting up stresses not parallel to the direction of the defect is applied on the article. The magnitude of the load must be such that the stresses effected in the brittle film do not approach closely to or exceed the rupture limit of the film, over areas of sound material within the region being tested. On the other hand, the load must be large enough to effect strains which, wherever concentrated by the presence of a defect, set up stresses in the film sufficiently large to exceed the rupture limit of the film. The result is the preferential cracking of the film above the defects of the rigid material. This renders the defects capable of easy detection, since the cracks in the film can be made visible by one of several methods disclosed hereinbelow.

A continuous film cracking at a strain of between 0.001 and 0.002 inch per inch of length has been found suitable. Numerous processes are adapted to the coating of the article to be treated with such a film. Various compositions such as lacquers, varnishes, resinous compositions and the like may be applied to effect a partial or complete coating by dipping, brushing, spraying or melting on. Such a coating must be allowed sufficient time to acquire its brittle properties.

The brittle films disclosed in my co-pending application entitled "Method of determining strain concentration in rigid articles," filed simultaneously with the present application, are also suitable for the purposes of the present invention.

The stressing of the surface may be effected by subjecting the article to a suitable tensile, bending, torsional, or impact load applied either as a steady, repeated or impact loading. An impact load such as that delivered by a blow with a hammer has been found particularly suitable. For delicate articles which might be marred by a steel hammer, a wooden, rubber or rawhide mallet may be used. The magnitude of the load required depends on the modulus of elasticity of the material being tested. Aluminum alloys require approximately one-third of the load necessary for steel. The latter metal requires a load sufficient to set up a tensile stress normal to the direction of any defects of between 1,000 and 60,000 lbs. per square inch, depending on the strain concentration effected by the defect. Where the crack to be rendered capable of easy detection is exceedingly minute, as in the case of a grinding crack less than one thousandth of an inch deep, the stress is suitably kept within the limits of 10,000 and 40,000 lbs. per square inch.

Methods of application of an impact blow must be adjusted to the shape and size of the material and to the direction of the suspected cracks. Plates are best loaded by striking the reverse side directly behind the cracks. Transverse cracks in rods may be detected by striking the end or by blows producing bending strains. Longitudinal cracks in rods require torsion loading produced by glancing surface blows or better by striking an arm fastened on the rod. Bulky shapes may be struck on several sides perpendicularly to the surface being investigated or struck on the surface being investigated immediately adjacently to the suspected surface area. The force of the blow must be proportioned to the size of the object. A blow producing a good sharp ringing vibration is usually sufficient. In terms of strain from 0.00005 to 0.0005 inch per inch tension must be applied normally to the suspected surface crack.

It is possible to so heavily strain the material by an excessive impact that general strain cracks will form in the brittle film. In actual practice, however, this occurs but rarely; the resulting cracks are easily recognized and distinguished by the regular and closely spaced pattern of cracks formed.

If the adherent brittle film is transparent, and if the surface coated thereby is uniformly light-reflecting, cracks in this brittle film are made easily visible by rays of light oblique thereto when viewed from the same angle as the impinging light. The easy visibility of cracks in glass depends on a similar phenomenon, the rays of light being reflected from the surfaces of the crack. When an opaque brittle coating is used, staining the cracks with a suitable stain, if necessary preceded by enlarging the cracks by etching with a suitable solvent, will render cracks in the brittle film easily visible by reflected light.

If an acid resistant brittle film is used, cracks therein may be etched sufficiently to expose the underlying metal surface, which is then etched with a suitable acid. After removal of the remaining brittle film, the presence, size and direction of defects in the metallic surface are indicated by etched areas thereon.

It is sometimes necessary to examine articles such as castings which do not have smooth, uniformly light-reflecting surfaces. Cracks produced in a transparent continuous brittle film covering a rough surface may be hard to detect even when illuminated obliquely. This difficulty may be overcome by giving the article a preliminary coating of a uniformly light-reflecting film on top of which the brittle film is applied. This undercoating may comprise bright metallic particles dispersed in lacquer or varnish, or any other composition of matter which is capable of producing a uniformly light-reflecting surface beneath the brittle film and which will not affect or be affected by the brittle film deposited thereon. Cracks in the overlying transparent film are easily visible when illuminated obliquely, and there is no confusion with incidental surface markings on the article being tested.

To illustrate a few of the many specific processes embodying the principles of this invention, the following examples are given which describe a few of the specific processes referred to in conjunction with the appended drawing, in which:

Figure 1 represents a longitudinal section of a metallic object treated according to my invention;

Figure 2 represents a longitudinal section of a similar metallic object treated according to a variant of my invention;

Figure 3 represents a front view of an airplane propeller being coated with a brittle film;

Figure 4 represents a front view of an airplane propeller coated according to my invention;

Figure 5 represents a lateral view of an airplane propeller coated according to my invention being stressed;

Figure 6 represents a lateral view of an airplane propeller being illuminated after treatment according to my invention;

Figure 7 represents a front view of an airplane propeller wherein a defect has been rendered visible according to my invention.

*Example I*

In Figure 1 the reference numeral 10 indicates a steel bar having a rectangular cross-section. This bar 10 has on its upper surface 11 a minute transverse surface crack 12 which is not visible to the naked eye. A rosin solution is applied, for instance, by brushing, on the bar 10, to cover the surface 11 with the continuous transparent adherent film 13. The rosin solution may suitably have the following composition:

| | Grams |
|---|---|
| Wood rosin K treated with 15% calcium acetate | 5 |
| Carbon disulfide | 8 |
| Dibutyl-phthalate | 0.4 |

After the film 13 has been allowed to dry sufficiently, which requires about five minutes when the above composition is used, a load is applied on the bar sufficient to cause a longitudinal tensile strain of between 0.001 and 0.002 inch per inch of length over the defect. The direction of stresses around the defect 12 is indicated by the arrows 14. These stresses effect strains which are concentrated adjacently to the defect 12, causing the film 13 to rupture above and in a direction parallel to the defect 12, to form the crack 15. The crack 15 may be rendered visible by illumination oblique thereto.

The crack 15 in the film 13 thus renders the presence, direction and size of the otherwise not apparent crack 12 in the bar 10 easily detectable.

Another method of utilizing the cracks in the brittle film for indicating the presence of defects comprises etching the cracks with gasoline down to the steel, then etching the metal surface so exposed with a suitable acid which does not attack the brittle film and finally removing the remaining brittle film, when the presence, size and direction of defects in the metallic surface will be indicated by etched areas thereon.

*Example II*

In Figure 2 the reference numeral 20 indicates a superficially somewhat rough bar of cast iron having a rectangular cross-section. This bar 20 has on its upper surface 21 a minute transverse crack 22 which is not visible to the naked eye. A suitable aluminum pigmented nitro-cellulose composition is applied on the bar 20, for instance by spraying, to form a uniformly light-reflecting undercoat 23 on the surface 21, which neither is affected by the rosin solution employed in Example I nor affects the film deposited by the latter. The following nitro-cellulose composition has been found to meet these requirements:

| | Grams |
|---|---|
| 20 second nitro-cellulose | 1 |
| High-leafing aluminum powder | 3 |
| Ethylacetate | 30 |

After the undercoat 23 has been allowed to dry sufficiently, which in case of the above composition requires about 5 minutes, a brittle film 24 is applied above the undercoat 23 by a process identical with that described in Example I. The bar 20 is then stressed as described in Example I, the arrows 25 indicating the direction of the stresses. The result is a crack 26 in the brittle film 24 which, when rendered visible as described in Example I, indicates the presence, direction and size of the crack 22.

*Example III*

In Figures 3 to 7 inclusive the reference numeral 30 indicates the blade of an airplane propeller fabricated from an aluminum alloy. The area 31 at the tip of the propeller blade is tested for the presence of fatigue cracks by being first cleaned of dirt and paint to provide a uniformly light-reflecting surface to which a brittle film can adhere. The blade is then dipped into a container indicated in Figure 3 by the reference numeral 32 which contains a liquid composition 33 which on drying or cooling is capable of covering the area 31 with a suitable adherent brittle coat. For this purpose molten resins such as wood rosin or various synthetic resins, molten sugar or inorganic compositions such as certain molten glasses or glazes may be used. The rosin solution employed in Examples I and II is also effective. If it is desired not to remove any paint present, the undercoat disclosed in Example II may be applied above the paint and the brittle film deposited on this undercoat as in Example II.

After the brittle film has been allowed to dry or cool sufficiently, the tip of the propeller blade, which latter is either still mounted in an engine or held at the same spot in a jig, is struck several sharp blows on both the front and rear faces with a rubber mallet. The point of impact is suitably some distance away from the particular area being tested, since the coating is destroyed at the point of impact. The surface coated is then examined with a concentrated light source such as the flash light 35 shown in Figure 6 held at an angle oblique to the film, the coated area being viewed from the same angle as the impinging light rays. The presence, size and direction of fatigue cracks will then be indicated by corresponding easily visible cracks such as the one indicated by the reference numeral 36 on Figure 7.

If an opaque brittle layer is used on the same propeller blade, no undercoating is necessary to provide an underlying uniformly light-reflecting surface. The following composition may be utilized for this purpose:

| | Grams |
|---|---|
| Wood rosin K treated with 15% calcium acetate | 5 |
| Carbon disulfide | 8 |
| Dibutyl-phthalate | 0.6 |
| Titanium dioxide | 2 |

This composition requires 12 hours to dry satisfactorily.

The propeller blade is stressed as described hereinbefore. Any cracks in the opaque brittle layer can be made easily visible by being stained with a black stain described hereinbelow. Such a staining is suitably preceded by a brief washing with gasoline, to enlarge the cracks by etching. The stained cracks of the opaque layer will indicate any superficial defects exactly as the cracks in the transparent film.

A suitable black stain can be made up from 1 gram carbon black, 0.01 gram sodium lauryl sulfate and 10 grams water.

It is to be particularly noted that these descriptive examples and the drawing comprised therein do not in any way limit the scope of my invention. The previous disclosure illustrated by these examples will teach those skilled in the art how to apply the principles of my invention to the detection of hidden defects in articles composed of many other substances such as Bakelite, wood, hard rubber, porcelain and the like, by coating them with a film of a more brittle material and subsequently applying a suitable load to the thus coated article. I am aware that numerous details of this process may be varied without departing from the principles of this invention, and I, therefore, do not purpose limiting the patent granted hereon otherwise than necessitated by the prior art.

I claim as my invention:

1. The method of making superficial flaws in a rigid article of high elastic limit capable of easy detection which comprises coating said article with a continuous adherent film having a rupture limit substantially lower than the elastic limit of said article and applying to said article a load of such magnitude and direction that the resulting stresses will exceed the rupture limit of said film only above said flaws while remaining below the elastic limit of said rigid article.

2. The method of making superficial flaws in a rigid article capable of easy detection which comprises coating said article with a continuous adherent brittle film and applying to said article a load of such magnitude and direction that the resulting strain will cause said film to crack only above said flaws.

3. The treatment of a metallic article for making superficial defects therein capable of easy detection which comprises coating said article with a continuous adherent film which will crack at a strain of between about 0.001 and about 0.002 inch per inch of length, and applying to said article a load of such magnitude and direction that the resulting strain will reach a numerical value of between about 0.001 and about 0.002 inch per inch of length only above said defects.

4. The method of making superficial flaws in a metallic article capable of easy detection which comprises coating said article with a continuous adherent brittle lacquer film, and applying to said article an impact load of such magnitude that said film will crack only above said flaws.

5. The method of making superficial flaws in a rigid article of high elastic limit capable of easy detection which comprises coating said article with a continuous transparent adherent film having a rupture limit substantially lower than the elastic limit of said article, applying to said article a load of such magnitude and direction that the resulting stresses will exceed the rupture limit of said film only above said flaws while remaining below the elastic limit of said rigid article, and obliquely illuminating said film whereby the presence, size and direction of said flaws may be noted from the presence, size and direction of any cracks in said film.

6. The method of making superficial flaws in a rigid article capable of easy detection which comprises coating said article with a transparent continuous adherent brittle film, applying to said article a load of such magnitude and direction that the resulting strain will cause said film to crack only above said flaws, and obliquely illuminating said film whereby the presence, size and direction of said flaws may be noted from the presence, size and direction of any cracks in said film.

7. The treatment of metallic articles for making superficial defects therein capable of easy detection which comprises coating said article with a continuous adherent transparent film which will crack at a strain of between 0.001 and about 0.002 inch per inch of length, applying to said article a load of such magnitude and direction that the resulting strain will reach a numerical value of between about 0.001 and about 0.002 inch per inch of length only above said defects, and obliquely illuminating said film whereby the presence, size and direction of said flaws may be noted from the presence, size and direction of any cracks in said film.

8. The method of making superficial flaws in a metallic article capable of easy detection which comprises coating said article with a transparent continuous adherent brittle lacquer film, applying to said article an impact load of such magnitude that said film will crack only above said flaws, and obliquely illuminating said film whereby the presence, size and direction of said flaws may be noted from the presence, size and direction of any cracks in said film.

9. The method of making superficial flaws in a rigid article of high elastic limit capable of easy detection which comprises coating said article with a continuous adherent opaque film having a rupture limit substantially lower than the elastic limit of said article, applying to said article a load of such magnitude and direction that the resulting stresses will exceed the rupture limit of said film only above said flaws while remaining below the elastic limit of said rigid article, and treating said film with a composition suitable for staining any cracks therein, whereby the presence, size and direction of said flaws may be noted from the presence, size and direction of stained cracks in said film.

10. The method of making superficial flaws in a rigid article of high elastic limit capable of easy detection which comprises coating said article with a continuous opaque adherent film having a rupture limit substantially lower than the elastic limit of said article, applying to said article a load of such magnitude and direction that the resulting stresses will exceed the rupture limit of said film only above said flaws while remaining below the elastic limit of said rigid article, etching said film with a suitable solvent and treating said film with a composition suitable for staining any cracks therein whereby the presence, size and direction of said flaws may be noted from the presence, size and direction of stained cracks in said film.

11. The method of making superficial flaws in a rigid article of high elastic limit capable of easy detection which comprises coating said article with a continuous adherent film having a rupture limit substantially lower than the elastic limit of said article, applying to said article a load of such magnitude and direction that the resulting stresses will exceed the rupture limit of said film only above said flaws while remaining below the elastic limit of said rigid article, etching said film with a suitable solvent so as to expose the surface of said article solely below any cracks in said film, etching said exposed surface with a substance to which said film is resistant, and removing said film whereby the presence, size and direction of said flaws may be noted from the presence, size and direction of etched areas on said surface of said article.

12. The method of making superficial flaws in a metallic article capable of easy detection which comprises coating said article with an opaque continuous adherent brittle film and applying to said article an impact load of such magnitude that said film will crack only above said flaws.

13. The method of making superficial flaws in a metallic article capable of easy detection which comprises coating said article with an opaque continuous adherent brittle film, applying to said article an impact load of such magnitude that said film will crack only above said flaws and treating said film with a composition suitable for staining any cracks in said film whereby the presence, size and direction of said flaws may be noted from the presence, size and direction of stained cracks in said film.

14. The method of making superficial flaws in metallic articles having surfaces which do not reflect light uniformly capable of easy detection which comprises coating said surfaces with an adherent film capable of producing a uniformly light-reflecting surface beneath a continuous adherent transparent brittle film, coating said light-reflecting film with a continuous transparent adherent brittle film and applying to said article an impact load of such magnitude that said brittle film will crack only above said flaws.

15. The method of making superficial flaws in metallic articles having surfaces which do not reflect light uniformly capable of easy detection which comprises coating said surfaces with an adherent film capable of producing a uniformly light-reflecting surface beneath a continuous adherent transparent brittle film, coating said light-reflecting film with a continuous transparent adherent brittle film, applying to said article an impact load of such magnitude that said brittle film will crack only above said flaws, and obliquely illuminating said brittle film whereby the presence, size and direction of said flaws may be noted from the presence, size and direction of any cracks in said brittle film.

16. The method of making superficial flaws in a metallic article having surfaces covered with an adherent film capable of easy detection which comprises coating said surfaces with an opaque continuous adherent brittle film, applying to said article an impact load of such magnitude that said brittle film will crack only above said flaws and treating said brittle film with a composition suitable for staining any cracks in said brittle film whereby the presence, size and direction of said flaws may be noted from the presence, size and direction of stained cracks in said brittle film.

GREER ELLIS.